(12) United States Patent
Krishnaprasad et al.

(10) Patent No.: US 7,752,221 B2
(45) Date of Patent: Jul. 6, 2010

(54) PROGRESSIVE RELAXATION ACROSS TIERS

(75) Inventors: Muralidhar Krishnaprasad, Fremont, CA (US); Meeten Bhavsar, Emerald Hills, CA (US); Hui Ouyang, Fremont, CA (US)

(73) Assignee: Oracle International Corp., Redwood Shores, CA (US)

( * ) Notice: Subject to any disclaimer, the term of this patent is extended or adjusted under 35 U.S.C. 154(b) by 247 days.

(21) Appl. No.: 11/649,010

(22) Filed: Jan. 3, 2007

(65) Prior Publication Data

US 2007/0208712 A1    Sep. 6, 2007

Related U.S. Application Data

(60) Provisional application No. 60/777,988, filed on Mar. 1, 2006, provisional application No. 60/853,508, filed on Oct. 20, 2006.

(51) Int. Cl.
*G06F 7/00* (2006.01)
*G06F 17/30* (2006.01)

(52) U.S. Cl. .................................................. 707/769

(58) Field of Classification Search ........................ None
See application file for complete search history.

(56) References Cited

U.S. PATENT DOCUMENTS

| | | | |
|---|---|---|---|
| 2003/0014483 A1* | 1/2003 | Stevenson et al. | 709/203 |
| 2004/0062426 A1* | 4/2004 | Lo | 382/124 |
| 2004/0199491 A1* | 10/2004 | Bhatt | 707/2 |
| 2004/0225643 A1* | 11/2004 | Alpha et al. | 707/3 |
| 2004/0260685 A1* | 12/2004 | Pfleiger et al. | 707/3 |
| 2005/0015381 A1* | 1/2005 | Clifford et al. | 707/100 |

OTHER PUBLICATIONS

Hawking et al, "Efficient and Flexible Search Using Text and Metadata", CSIRO Mathematical and Information Sciences Technical Report 2000/83, 13 pages.*

* cited by examiner

*Primary Examiner*—Uyen T. Le
(74) *Attorney, Agent, or Firm*—Kraguljac & Kalnay, LLC

(57) ABSTRACT

Systems, methods, and other embodiments associated with progressive relaxation across tiers of a search system are described. One system embodiment includes a first tier of computing components that stores search data that can be used to locate documents. The system embodiment may also include a second tier of computing components that also store search data that can be used to locate documents. The system may also include a query logic that receives a query and locates a set of items relevant to the query by selectively progressively relaxing a search across the search data stored at different levels until a threshold is met.

22 Claims, 6 Drawing Sheets

US 7,752,221 B2

PROGRESSIVE RELAXATION ACROSS TIERS

CROSS REFERENCE TO RELATED APPLICATIONS

This application claims the benefit of U.S. Provisional Patent Application Ser. No. 60/777,988 filed Mar. 1, 2006, titled "Systems and Methods For Searching" and of U.S. Provisional Patent Application Ser. No. 60/853,508 filed Oct. 20, 2006, titled "Progressive Relaxation Across Tiers".

BACKGROUND

A variety of data may be stored in a number of locations. For example, documents (e.g., word processing files, spreadsheets, presentations, web pages) may be stored in different locations distributed throughout an enterprise. Keeping track of all this data can be a daunting task. Finding particular pieces of this data in a timely manner using appropriate amounts of resources can be even more daunting.

Search systems are expected to provide responses within the shortest amount of time possible, even though millions and millions of documents may need to be searched. Additionally, responses are to be produced using the least amount of resources to keep costs as low as possible. However, these may be conflicting goals. One approach to reduce response time has been to "move the data closer to the searcher" by caching certain documents closer to a searcher (e.g., on searcher desktop system) in a system that supports searching. However, caching too many documents too close to the searchers consumes significant resources and creates replication and update issues.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DEFINITIONS

Figure 1:
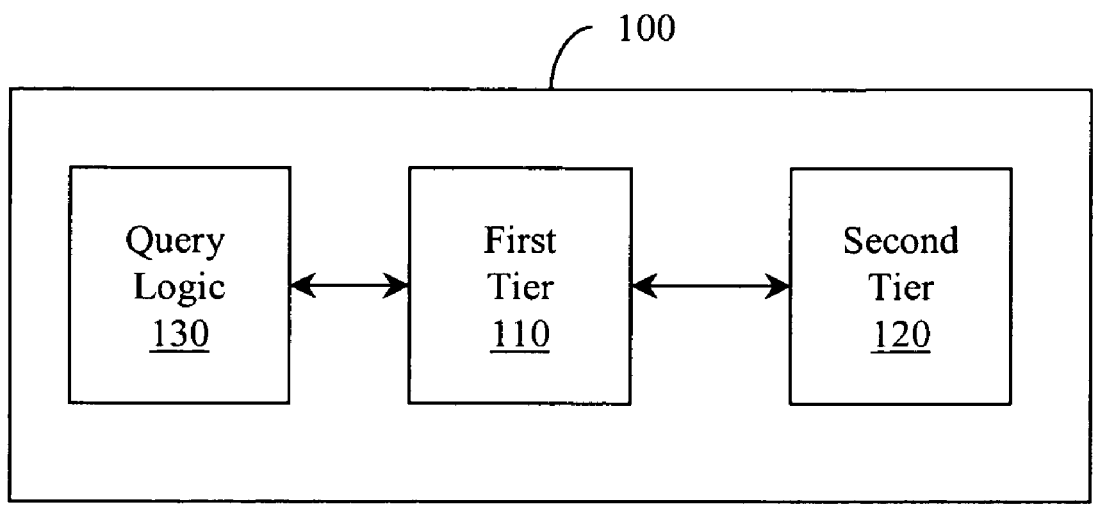
FIG. 1 illustrates a search system having two tiers.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software stored on a computer-readable storage medium, combinations thereof). Computer components may include, for example, a process running on a processor, a processor, an object, an executable stored on a computer-readable storage medium, a thread of execution stored on a computer-readable storage medium, a program stored on a computer-readable storage medium, and a computer. A computer component may be localized on one computer and/or may be distributed between multiple computers.

"Document", as used herein, refers to an item of information. A document may by, for example, a file, a web page, an email, a spread sheet, and so on.

"Enterprise", as used herein, refers to a set of computing resources belonging to an organization, where the organization may be a single entity (e.g., company, university) and/or a formally defined collection of entities (e.g., set of franchises), and where the computing resources may include repositories of data and logic for processing data available in those repositories. An enterprise has identifiable boundaries and identifiable ownership.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment, though it may.

"Machine-readable medium", as used herein, refers to a medium that participates in directly or indirectly providing signals, instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), and so on.

"Logic", as used herein, includes but is not limited to hardware, firmware, software stored or in execution on a machine and/or combinations thereof to perform a function (s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions stored on a machine-readable medium that can be read, interpreted, compiled, and/or executed by a computer and/or processor. Software causes a computer, processor, or other electronic device to perform functions, actions and/or behave in a desired manner. Software may be embodied in various forms including routines, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, machine-readable and/or executable instructions may be located in one logic and/or distributed between multiple communicating, co-operating, and/or parallel processing logics and thus may be loaded and/or executed in serial, parallel, massively parallel and other manners. Software, whether an entire system or a component of a system, is embodied as an article of manufacture and maintained or provided as part of a machine-readable medium.

DETAILED DESCRIPTION

Example systems and methods store (e.g., cache) selected information (e.g., metadata, text) at selected levels (e.g., web-tier, mid-tier, database-tier) in a multi-tiered search system (e.g., enterprise search system) to facilitate efficiently responding to queries for documents. In one example, the documents may belong to an enterprise. Example systems and methods also do selective progressive relaxation of a query across selected levels of the multi-tiered search system to facilitate finding relevant documents in a timely fashion while limiting the amount of resources consumed at the different levels while limiting the amount of overhead invoked in keeping the stored information fresh.

Progressive relaxation across the tiers facilitates improving response time by first looking for useful (e.g., highly valued) matches (e.g., titles) at a first level (e.g., web-tier) and then selectively looking for other (e.g., lesser valued) matches (e.g., other metadata) at other levels (e.g., mid-tier) before selectively looking for other (e.g., lowest valued) matches (e.g., text) at a final level (e.g., database level).

FIG. 1 illustrates a search system 100 having two tiers. System 100 may include a first tier 110 of computing components. A "tier" may be thought of as a related set of computing components logically organized into a "level" of computers and/or functionality. Thus, while a single box 110 is illustrated, this single box may represent a number of computing components. For example, it could represent a set of desktop computers in a law firm. Members of the first tier 110 of computing components may be, for example, computers, computing systems, programs running on a computer (e.g., browser, application), and so on. Members of the first tier 110 may be networked together, may communicate data, and so on. In one example, the first tier 110 of computing components may be a "web-tier", where the computing components interface with the world wide web ("Web") or with an enterprise web ("web") and/or perform web-related actions. A web-tier computing component may, for example, facilitate browsing the web, facilitate downloading an item from the web, facilitate receiving a query from the web, and so on. Users may interface directly (e.g., type, read output) with web-tier components.

Computing components in first tier 110 may store a first set of search data that is related to a set of documents belonging, for example, to an enterprise. In one example, the first set of search data may include a first set of metadata (e.g., document title). While a document title is described, it is to be appreciated that other metadata may be stored in the first tier 110. Furthermore, while a single item of metadata is described, it is to be appreciated that more than one piece of metadata may be stored in a member of first tier 110. The first set of search data may be selected to facilitate finding relevant documents on a first relaxation of a query. For example, given a query "Oracle and SES", and given a first set of search data that includes a list of document titles or a reverse index of document titles, a set of relevant documents having Oracle in the title may be found by examining the first search data stored in the first tier 110.

The first set of search data may be stored in different ways in the first tier 110. For example, the first set of search data may be distributed between members of the first tier 110, may be replicated on different members of the first tier 110, and so on. As will be described later, in one example the composition (e.g., membership) of the first set of search data may be dynamically updated to react to query service patterns.

System 100 may also include a second tier 120 of computing components. The second tier 120 of computing components are in data communication with the first tier 110. Once again, while a single box 120 is illustrated, this single box may represent a number of computing components. For example, it could represent a set of server computers that provide services to a set of desktop computers. These servers may be networked together. These servers may also be networked together with members of the first tier 110. In one example, the second tier 120 may be referred to as a "database-tier". Members of a database tier may perform database functions including, for example, storing documents, storing an index, storing a reverse index, returning items in response to a query, and so on. Second tier 120 may store the actual documents.

Like members of the first tier 110 may store search data, members of the second tier 120 may also store search data related to the set of documents. In one example, search data stored on the second tier 120 may not intersect with search data stored on the first tier 110. However, in some examples, overlap may occur. In one example, the second set of search data may include a second set of metadata (e.g., metatags, keywords). In another example, the second set of search data may also include a portion of the body of a document (e.g., first sentence, first paragraph, first 10%), or may include the entire body of a document. Thus, to support progressive relaxation, search data stored in the first tier 110 may be examined first to find items relevant to a query and then search data stored in the second tier 120 may be examined to find additional items relevant to the query. If enough items are found by examining the search data stored in the first tier 110 then the search data stored in the second tier 120 may not be examined.

The second set of search data may be stored in different ways. For example, the second set of search data may be distributed between members of the second tier 120 and/or may be replicated on different members of the second tier 120. Consider the example with the query "Oracle and SES". Assume that seven relevant documents were located by examining the first search data. Search data on second tier 120 may be examined to find, for example, three additional documents so that a search criteria of ten relevant documents being found is satisfied.

System 100 may also include a query logic 130 that receives queries. Query logic 130 may locate a set of items relevant to the query by selectively progressively relaxing a search across tiers of a multi-tier search system. Thus, a first portion of a selectively progressively relaxed search may be sent to the first tier 110 to try to locate documents using the first set of search data. Similarly, a second portion of a selectively progressively relaxed search may be sent to the second tier 120 to try to locate documents using the second set of search data. Different portions may be sent to different levels until a threshold is met. The threshold may be, for example, receiving a pre-determined number of documents having at least a pre-determined relevancy, reaching a pre-determined level in the multi-tiered enterprise search system, consuming more than a pre-determined amount of time, and so on.

The query logic 130 may provide items produced by progressively relaxing a query in different ways. In one example, the query logic 130 may distribute a progressively relaxed portion of the query to members of the different tiers of computing components. In another example, the query logic 130 may federate a progressively relaxed portion of the query to members of the different tiers of computing components. While distribution and federation are described separately, it is to be appreciated that query logic 130 may employ other distribution methods and/or may combine methods.

Figure 2:
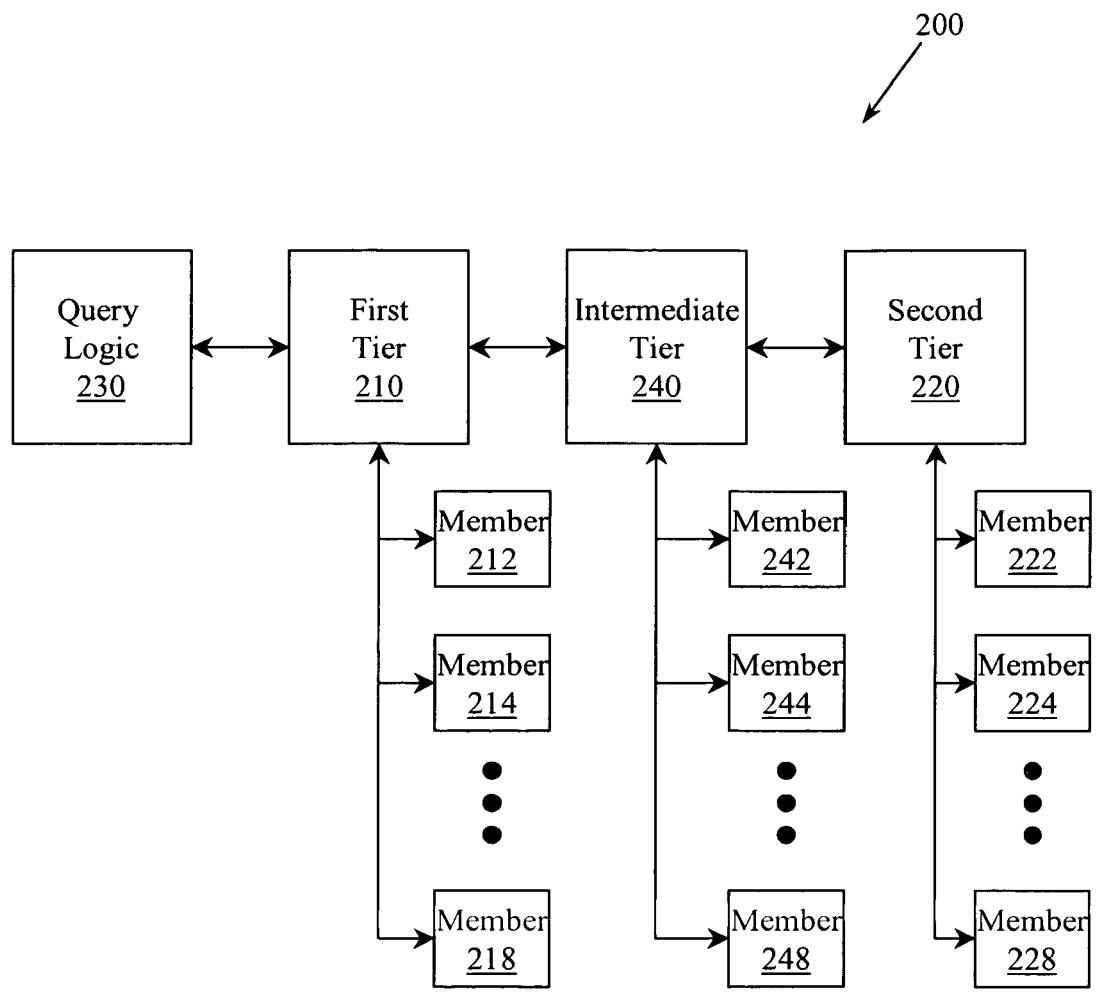
FIG. 2 illustrates a search system having three tiers.

FIG. 2 illustrates a search system 200 having three tiers. System 200 includes some elements similar to those described in connection with FIG. 1. For example, system 200 includes a first tier 210 of computing components, a second tier 220 of computing components, and a query logic 230. The first tier 210 may be, for example, a web-tier and the second tier 220 may be, for example, a database tier.

Additionally, system 200 includes an intermediate tier 240 of computing components in data communication with the first tier 210 and the second tier 220. The intermediate tier 240 is logically located between the first tier 210 and the second tier 220. Like the other tiers, the intermediate tier 240 may also store search data. For example, intermediate tier 240 may store an intermediate set of search data. The intermediate set of search data may include metadata, portions of the bodies of documents, and so on. In one example, the sets of search data stored at the different levels will be mutually exclusive. In other examples, there may be some overlap between levels. With the three levels illustrated in system 200, the progressive relaxation performed by query logic 230 could occur across more levels than in system 100 (FIG. 1).

While three levels are illustrated with the addition of a single intermediate tier 240, it is to be appreciated that system 200 could include a set of intermediate tiers 240 and thus system 200 could include, three, four, or more tiers. FIG. 2 also illustrates that the different tiers may include a set of members. For example, the first tier 210 may include computing component members 212 through 218. Similarly the second tier 220 may include computing component members 222 through 228 and intermediate tier 240 may include computing component members 242 through 248. In one example, members of a tier (e.g., members 212 . . . 218) may all be in direct data communication with each other. In another example, members of a tier (e.g., members 212 . . . 218) may communicate with a central computer associated with that tier.

Figure 3:
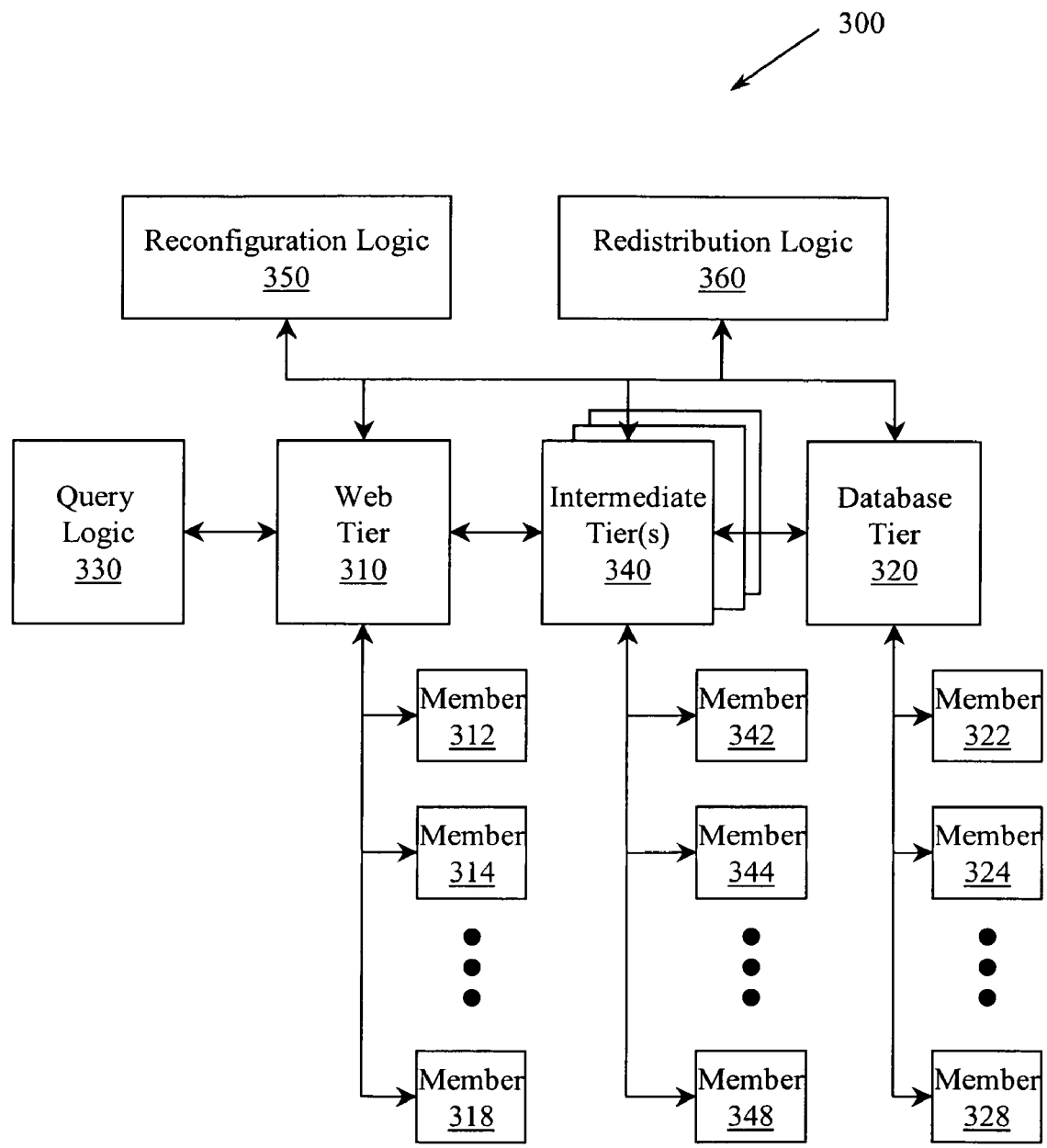
FIG. 3 illustrates a dynamically reconfigurable search system.

FIG. 3 illustrates a dynamically reconfigurable search system 300. System 300 includes some elements similar to those described in connection with FIGS. 1 and 2. For example, system 300 includes a first tier of computing components (e.g., web-tier 310), a second tier of computing components (e.g., database tier 320), an intermediate tier(s) of computing components 340, and a query logic 330. The different tiers may include various members (e.g., members 312 . . . 318, members 322 . . . 328, members 342 . . . 348) that store various sets of search data (e.g., metadata, portions of text, text).

Additionally, system 300 includes a reconfiguration logic 350. Reconfiguration logic 350 facilitates selectively altering the number of tiers in the search system 300. For example, system 300 may initially have a web tier 310, a database tier 320, and a single intermediate tier 340. However, query satisfaction analysis may reveal that an undesirable number of queries are being satisfied at the database tier 320. Thus, reconfiguration logic 350 may add an additional intermediate tier 340 to system 300. Adding the tier may include, for example, logically connecting additional computing components to system 300, replicating applications that form intermediate tier 340, and so on.

In another example, system 300 may have reached a state where there are several intermediate tiers 340. However, query volume may drop over time to where the amount of resources required to maintain the several intermediate tiers is not justified. Thus, reconfiguration logic 350 may determine to remove an intermediate tier 340. Removing the tier may include, for example, logically disconnecting computing components from system 300, shutting down computers and/or computer programs, reducing the number of instances of a running application, and so on.

In one example, the reconfiguration logic 350 may be controlled, at least in part, by a relaxation value that describes a distribution of relaxation levels at which a set of searches has been satisfied. The relaxation value may be computed, for example, by comparing the total number of queries to the number of relevant documents located using different elements relaxed out of a query. In another example, the reconfiguration logic 350 may be controlled, at least in part, by a tier value that describes a distribution of tiers at which a set of searches has been satisfied. The tier value may be computed, for example, by comparing the total number of queries to the number of relevant documents located at different levels in system 300. The tier value may also be computed, for example, by examining the volume of queries being processed in terms of the resources used to process those queries.

System 300 may also include a redistribution logic 360. Redistribution logic 360 may facilitate selectively altering the composition of a set(s) of search data. For example, system 300 may initially have a web tier 310, a database tier 320, and a single intermediate tier 340 at which different sets of search data are stored. However, query satisfaction analysis may reveal that queries are being satisfied at either the web-tier 310 or the database tier 320 but not at the intermediate tier 340. Additionally, resource analysis may reveal that an undesirable amount of data is stored at the web-tier 310. Thus, redistribution logic 360 may determine how stored search data should be redistributed between the various tiers to improve search satisfaction distribution and/or resource consumption. For example, some search data stored in web-tier 310 may be relocated to an intermediate tier 340.

In one example, redistribution logic 360 may be controlled, at least in part, by a relaxation value that describes a distribution of relaxation levels at which a set of searches have been satisfied. The relaxation value may be computed, for example, by comparing the total number of queries to the number of relevant documents located using different elements relaxed out of a query. The relaxation value may also be computed, for example, by comparing the number of queries satisfied at a tier to the amount of resources consumed storing search information at that tier. In another example, the redistribution logic 360 may be controlled, at least in part, by a tier value that describes a distribution of tiers at which a set of searches has been satisfied. The tier value may be computed, for example, by comparing the total number of queries to the number of relevant documents located at different levels in system 300. The tier value may also be computed, for example, by examining the volume of queries being processed in light of the resources used to process those queries.

Some portions of the detailed descriptions that follow are presented in terms of method descriptions and representations of operations on electrical and/or magnetic signals capable of being stored, transferred, combined, compared, and otherwise manipulated in hardware. These are used by those skilled in the art to convey the substance of their work to others. A method is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

In one example, a method may be implemented as processor executable instructions. Thus, in one example, a machine-readable medium may store processor executable instructions that if executed by a machine (e.g., processor) cause the machine to perform a method. While the method described below is described being stored on a machine-readable medium, it is to be appreciated that other example methods described herein may also be stored on a machine-readable medium.

Figure 4:
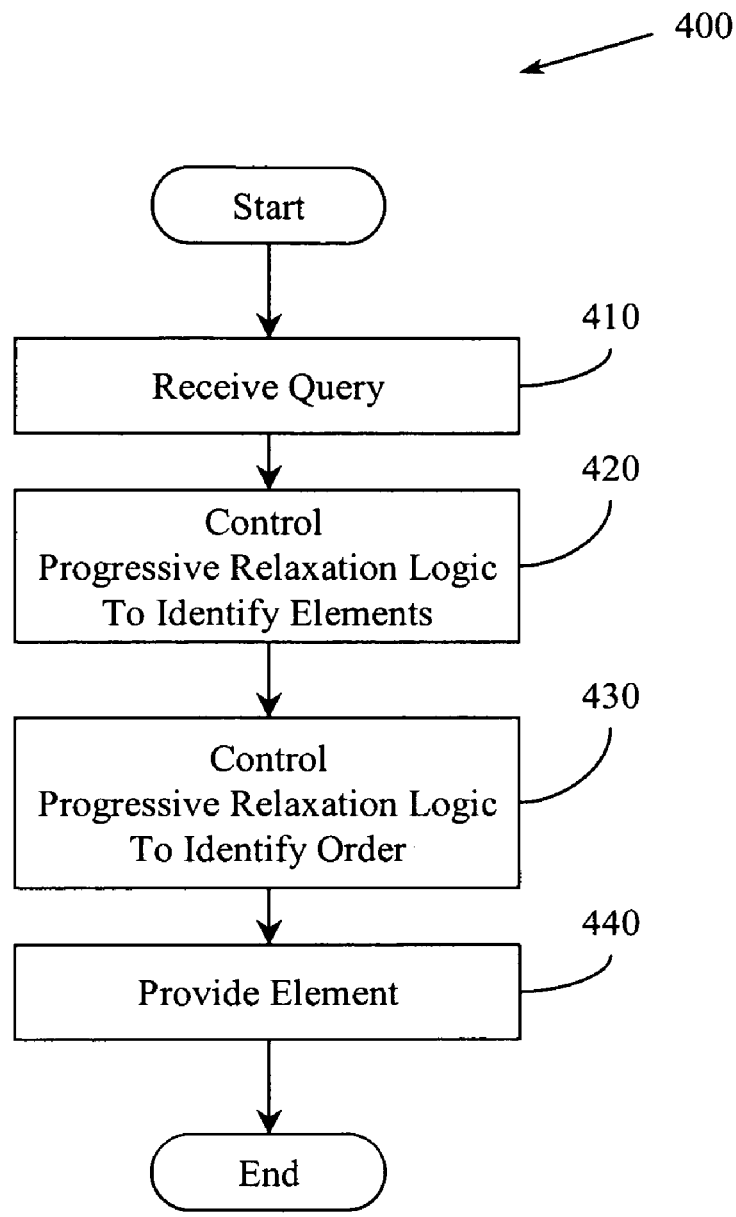
FIG. 4 illustrates an example method associated with progressive relaxation across tiers of a search system.

FIG. 4 illustrates a method 400 that may be stored on a machine-readable medium. Method 400 is associated with progressive relaxation across tiers of a search system. In one example, the search system may be an enterprise search system. Method 400 may include, at 410, receiving a query to locate a set of documents relevant to the query. Since method 400 may be performed by logics in a search system, in one example the set of documents may belong to an enterprise that can be searched by the enterprise search system. Since an enterprise search system may be multi-tiered, search information concerning the documents belonging to the enterprise may be cached at different levels of the multi-level cache system.

Method 400 may also include, at 420, controlling a progressive relaxation logic to relax an element out of the query. For example, a query "Oracle and SES" may be relaxed to identify a first "proper name" element that is likely to appear in a title (e.g., Oracle). The progressive relaxation logic may also be controlled to relax out "SES" as a term not likely to appear in a title because it is not a recognized proper name. Thus, the progressive relaxation logic may be controlled to identify a set of elements that can be provided to different levels of the multi-level cache system to locate members of the set of documents in an efficient manner. For example, the term Oracle may first be provided to a first tier where title information may be cached. If a search criteria is not satisfied, the terms Oracle and/or SES may then be provided to either the first tier and/or subsequent tiers until the search criteria is satisfied.

Method 400 may also include, at 430, controlling a progressive relaxation logic to identify an order in which the set of elements can be provided to different levels of the multi-level cache system. The order may be determined, for example, by identifying more common terms that are less likely to lead to large degrees of separation in relevancy and by identifying less common terms that are more likely to lead to large degrees of separation in relevancy.

Method 400 may also include, at 440, providing, in order, members of the set of elements related to the query to a selected level in the multi-level data caching system. These members may be provided, for example, until a search threshold is reached. The threshold may concern, for example, a number of documents to retrieve, a total relevancy score for documents retrieved, a lower boundary on relevance of documents retrieved, and so on.

In one example, method 400 may also include selectively providing a member of the set of elements to a second level of the multi-level cache system when providing a member of the set of elements to a first level of the multi-level cache system did not cause the search threshold to be reached. The second level of the multi-level cache system may be considered to be "deeper" than the first level of the multi-level cache system. For example, the first level may be a web-tier level and the second level may be a database-tier level. In this example, the second level of the multi-level cache system stores more information per document than the first level of the multi-level cache system. Indeed, the second level may store the complete text of a document.

Figure 5:
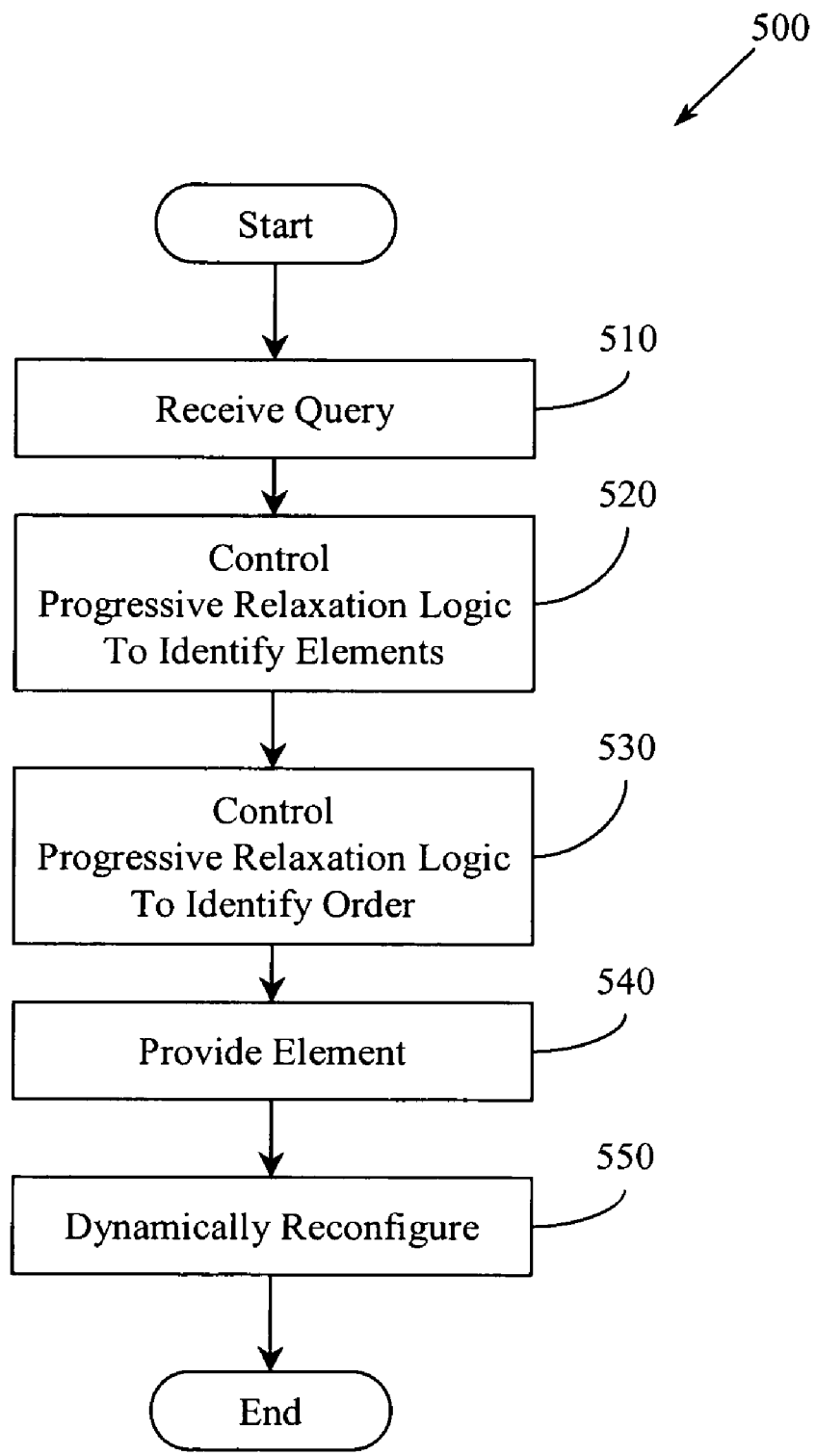
FIG. 5 illustrates an example method associated with adapting progressive relaxation across tiers of a search system.

FIG. 5 illustrates a method 500 associated with adapting a system in which progressive relaxation across tiers of a search system (e.g., enterprise search system) occurs. Method 500 includes some actions (e.g., 510, 520, 530, 540) like those described in connection with FIG. 4. Additionally, method 500 includes, at 550, dynamically reconfiguring characteristics of a multi-tier search system. The reconfiguring may involve changing, for example, the number of levels in the multi-level cache system. By way of illustration, a query satisfaction distribution and/or query volume analysis may indicate that an additional tier is required. Thus, the reconfiguring may include logically adding another tier to a multi-level cache system. The reconfiguring may also include, for example, changing the number of members in a level in the multi-level cache system. By way of illustration, a query satisfaction and/or query volume analysis may indicate that a tier is being under-utilized. Thus, the reconfiguring may include removing members from the tier so that resources are not wasted. The reconfiguring may also include, for example, changing the composition of search information stored at a level in the multi-level cache system. By way of illustration, query satisfaction distribution analysis may indicate that an undesirable number of queries are being processed by a single tier. Thus, the reconfiguring may involve moving some of the search data stored at that single tier into a previous and/or subsequent tier to spread out the query satisfaction.

While FIG. 5 illustrates various actions occurring in serial, it is to be appreciated that various actions illustrated in FIG. 5 could occur substantially in parallel. By way of illustration, a first process could process queries and a second process could dynamically reconfigure the search system. While two processes are described, it is to be appreciated that a greater and/or lesser number of processes could be employed and that lightweight processes, regular processes, threads, and other approaches could be employed.

Figure 6:
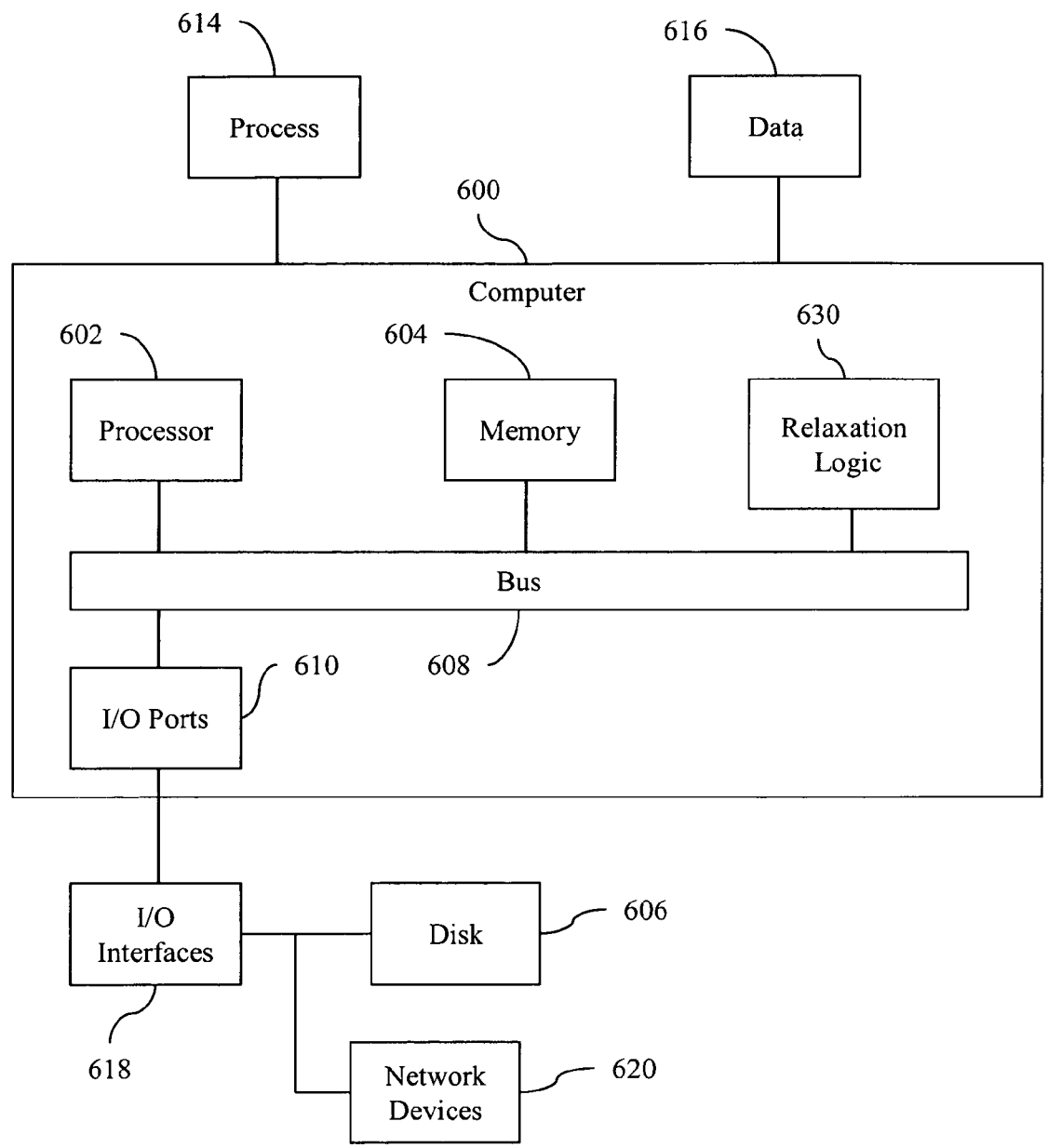
FIG. 6 illustrates an example computing environment in which example methods illustrated herein may operate.

FIG. 6 illustrates an example computing device in which example methods described herein, and equivalents, may operate. The example computing device may be a computer 600 that includes a processor 602, a memory 604, and input/output ports 610 operably connected by a bus 608. In one example, the computer 600 may include a progressive relaxation logic 630 configured to facilitate progressively relaxing a search across tiers in an enterprise search system. In different examples, the logic 630 may be implemented in hardware, software, firmware, and/or combinations thereof. Thus, the logic 630 may provide means (e.g., hardware, software, firmware) for providing a first portion of a selectively relaxed query to a first tier of a multi-tiered search system. Logic 630 may also provide means (e.g., hardware, software, firmware) for selectively providing different portions of the selectively relaxed query to different tiers of the multi-tiered search system. The different portions of the relaxed query may be provided until, for example, a search criteria is satisfied. While the logic 630 is illustrated as a hardware component operably connected to the bus 608, it is to be appreciated that in one example, the logic 630 could be implemented in the processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, and/or a memory stick. Furthermore, the disk 606 may be a CD-ROM, a CD recordable drive (CD-R drive), a CD rewriteable drive (CD-RW drive), and/or a digital video ROM drive (DVD ROM). The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, SATA, Infiniband, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method comprising:
   receiving, with a query logic implemented on a computer processor, a query to locate one or more documents from a set of documents stored in one or more computer components of a database tier of a multi-tiered computer system, where a document is stored as document data that includes document text and metadata;

executing the query on a first set of search data to identify documents that meet the query, the first set of search data comprising proper subsets of document data for one or more documents in the set of documents stored in the database tier, the first set of search data being cached in one or more computer components of a first tier of the multi-tiered computer system that is different from the database tier; and returning results of the query on the first set of search data.

2. The method of claim 1 comprising executing the query on the document data stored in the database tier if a search threshold is not met by the documents identified by execution of the query on the first set of search data.

3. The method of claim 1 where a second set of search data is cached in one or more computer components of a second tier of the multi-tiered computer system that is different from the database tier, the second set of search data comprising proper subsets of document data for one or more documents in the set of documents stored in the database tier and where the method comprises:

executing the query on the second set of search data if a search threshold is not met by the documents identified by execution of the query on the first set of search data; and executing the query on the set of documents stored in the database tier if a search threshold is not met by the documents identified by execution of the query on the second set of search data.

4. The method of claim 3 comprising:

determining a tier in the multi-tier computer system on which the query was received;

selecting the first set of search data on which to execute the query by selecting a set of search data that is cached in a tier that is first most proximate to the tier on which the query was received; and selecting the second set of search data on which to execute the query by selecting a set of search data that is cached in a tier that is second most proximate to the tier on which the query was received.

5. The method of claim 3 where the first and second tiers comprise different tiers of the multi-tier computer system.

6. The method of claim 1 comprising:

determining a tier in the multi-tier computer system on which the query was received; and selecting the first set of search data on which to execute the query by selecting a set of search data that is that is cached in a tier that is most proximate to the tier on which the query was received.

7. The method of claim 1 comprising selecting one or more query elements from the query to form a relaxed query and executing the relaxed query on the first set of search data.

8. A multi-tier search system, comprising:

a database tier of computer components to store a set of documents, where a document is stored as document data that includes document text and metadata;

a first tier of computer components having cached therein a first set of search data, the first set of search data comprising proper subsets of document data for one or more documents in the set of documents stored in the database tier, where the first tier is in a different tier of the multi-tier search system from the database tier; and a query logic to receive a query and to execute the query on the first set of search data to identify documents relevant to the query.

9. The multi-tier search system of claim 8 comprising a second tier of computer components having cached therein a second set of search data, the second set of search data comprising proper subsets of document data for one or more documents in the set of documents stored in the database tier, where the second tier is in a different tier of the multi-tier search system from the database tier, and further where the query logic executes the query on the second set of search data when a search threshold is not met by documents identified by execution of the query on the first set of search data.

10. The multi-tier search system of claim 8 where the first set of search data comprises metadata for one or more documents in the set of documents.

11. The multi-tier search system of claim 8 where the first set of search data comprises a portion of document text for one or more documents in the set of documents.

12. The multi-tier search system of claim 8 including a reconfiguration logic to selectively alter the number of tiers in the enterprise search system based, at least in part, on a query satisfaction analysis that determines at which tiers search thresholds to queries have been met.

13. The multi-tier search system of claim 8 including a redistribution logic to selectively alter the composition of sets of search data based, at least in part, on a query satisfaction analysis at which tiers search thresholds to queries have been met.

14. A machine-readable medium having stored thereon machine-executable instructions that if executed by a machine cause the machine to perform a method, the method comprising:

receiving a query to locate documents relevant to the query in a set of documents stored in a database tier of the multi-tier search system, where a document is stored in the database tier as document data that includes document text and metadata, and further where sets of search data comprising one or more proper subsets of the document data for one or more documents in the set of documents stored in the database tier are cached in at least one different tier of a multi-tier search system from the database tier;

selecting a first set of search data on which to execute the query;

executing the query on the selected set of search data; and returning query results.

15. The machine-readable medium of claim 14 where the selecting is performed by determining a set of search data that is cached in a most proximate tier to a tier in which the query was received.

16. The machine-readable medium of claim 14 comprising selecting subsequent sets of search data and executing the query on the selected sets of search data until a search threshold is met.

17. The machine-readable medium of claim 16 where the selecting of a subsequent set of search data is performed by selecting a set of search data that is cached in a next most proximate tier to a tier in which a previous selected set of search data is cached.

18. The machine-readable medium of claim 17 where the next most proximate tier is the same tier in which the previous selected set of search data is cached.

19. The machine-readable medium of claim 14 where the executing of the query on the first set of search data is performed by selecting one or more query elements from the query to form a relaxed query that is executed on the first set of search data.

20. The machine-readable medium of claim 14 where the first set of search data comprises metadata for one or more documents in the set of documents.

21. The machine-readable medium of claim 14 where the first set of search data comprises a portion of document text for one or more documents in the set of documents.

22. A system, comprising:

means for receiving a query to locate one or more documents from a set of documents stored in a one or more computer components of a database tier of a multi-tiered computer system, where a document is stored as document data that includes document text and metadata, and further where sets of search data comprising one or more proper subsets of the document data for one or more documents in the set of documents stored in the database tier are cached in at least one different tier of a multi-tier search system from the database tier;

means for providing the query to a first tier of the multi-tiered search system; and means for selectively repetitively providing the query to different tiers of the multi-tiered search system until a search criteria is satisfied.

* * * * *

UNITED STATES PATENT AND TRADEMARK OFFICE
CERTIFICATE OF CORRECTION

| | |
|---|---|
| PATENT NO. | : 7,752,221 B2 |
| APPLICATION NO. | : 11/649010 |
| DATED | : July 6, 2010 |
| INVENTOR(S) | : Muralidhar Krishnaprasad et al. |

It is certified that error appears in the above-identified patent and that said Letters Patent is hereby corrected as shown below:

In column 3, line 26, delete "servelet," and insert -- servlet, --, therefor.

In column 11, line 46, in claim 6, after "data" delete "that is".

Signed and Sealed this
Third Day of May, 2011

David J. Kappos
*Director of the United States Patent and Trademark Office*